United States Patent
Senzaki

(10) Patent No.: US 10,400,078 B2
(45) Date of Patent: Sep. 3, 2019

(54) SURFACE TREATMENT LIQUID

(71) Applicant: TOKYO OHKA KOGYO CO., LTD., Kawasaki-shi (JP)

(72) Inventor: Takahiro Senzaki, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 311 days.

(21) Appl. No.: 15/271,648

(22) Filed: Sep. 21, 2016

(65) Prior Publication Data

US 2017/0088683 A1 Mar. 30, 2017

(30) Foreign Application Priority Data

Sep. 25, 2015 (JP) .................... 2015-188926
Sep. 20, 2016 (JP) .................... 2016-183160

(51) Int. Cl.

| C08J 7/04 | (2006.01) |
|---|---|
| C09D 133/14 | (2006.01) |
| C09D 133/16 | (2006.01) |
| C09D 133/20 | (2006.01) |
| C09D 133/24 | (2006.01) |
| B05D 1/00 | (2006.01) |
| C08K 5/09 | (2006.01) |
| C08K 5/42 | (2006.01) |
| C08K 5/45 | (2006.01) |
| C08K 5/52 | (2006.01) |
| C09D 125/18 | (2006.01) |
| C09D 5/16 | (2006.01) |

(52) U.S. Cl.
CPC .............. *C08J 7/04* (2013.01); *B05D 1/005* (2013.01); *C08K 5/09* (2013.01); *C08K 5/42* (2013.01); *C08K 5/45* (2013.01); *C08K 5/52* (2013.01); *C09D 5/1662* (2013.01); *C09D 125/18* (2013.01); *C09D 133/14* (2013.01); *C09D 133/16* (2013.01); *C09D 133/24* (2013.01); *C08J 2325/18* (2013.01); *C08J 2333/14* (2013.01); *C08J 2333/16* (2013.01); *C08J 2333/24* (2013.01)

(58) Field of Classification Search
CPC .. C09D 5/1662; C09D 133/14; C09D 133/16; C09D 133/20; C09D 133/24; B05D 1/005; C08J 7/04
See application file for complete search history.

(56) References Cited

U.S. PATENT DOCUMENTS 6,200,672 B1 * 3/2001 Tadokoro ............... C09D 5/086
106/14.12

FOREIGN PATENT DOCUMENTS

| EP | 2862634 A1 | 4/2015 |
| EP | 2907897 A1 | 8/2015 |
| JP | 5437523 B | 3/2014 |
| WO | WO 2008/065696 A1 | 6/2008 |

OTHER PUBLICATIONS

Extended European search report in European Patent Application No. 16190073.3, dated Dec. 7, 2016.

* cited by examiner

*Primary Examiner* — Vu A Nguyen
(74) *Attorney, Agent, or Firm* — Knobbe, Martens, Olson & Bear LLP

(57) ABSTRACT

A surface treatment liquid capable of making a surface of a treatment target hydrophilic or hydrophobic without including a resin having a coating film formation property, and a surface treatment method using the surface treatment liquid. The surface treatment liquid includes a resin, a solvent and a strong acid having a pKa of 1 or less. The resin includes a functional group I that is at least one of a hydroxyl group, a cyano group, and a carboxyl group, and a functional group II that is a hydrophilic group or a hydrophobic group other than the functional group I.

12 Claims, No Drawings

SURFACE TREATMENT LIQUID

This application claims to Japanese Patent Application No. 2015-188926, filed Sep. 25, 2015; and Japanese Patent Application No. 2016-183160, filed Sep. 20, 2016, the contents of which are incorporated herein by reference.

BACKGROUND OF THE INVENTION

Field of the Invention

The present invention relates to a surface treatment liquid, and a surface treatment method using the surface treatment liquid.

Related Art

Conventionally, in order to modify properties of surfaces of various types of articles, various surface treatment liquids have been used. Among surface modification, there are many demands for making the surfaces of articles hydrophilic or hydrophobic, and accordingly many agents and surface treatment liquids for making the surfaces of articles hydrophilic or hydrophobic have been proposed.

For such agents for surface treatment, for example, as a surface conditioner capable of imparting a hydrophilic property and an antifouling property to a coating film surface, a copolymer having a weight-average molecular weight of 1500 to 50000 in which at least an acrylamide monomer and a siloxy group-containing mono(meth)acrylate monomer having a specific skeleton are copolymerized has been proposed (Patent Document 1).

Patent Document 1: Japanese Patent No. 5437523

SUMMARY OF THE INVENTION

However, in the case of performing a hydrophilic treatment by using the surface conditioner disclosed in Patent Document 1, even when a surface of a treatment target is treated with a solution including only the surface conditioner, the surface conditioner is not easily attached to the surface of the treatment target, and thus a desired hydrophilic effect cannot easily be achieved. Therefore, Patent Document 1 uses a solution as a surface treatment liquid obtained by blending a solution of a surface conditioner with resin such as acrylic resin, polyester resin, urethane resin, alkyd resin, epoxy resin, and polyamine resin, as a coating film formation component.

Further, in the case of using the surface treatment liquid including the surface conditioner and the coating film formation component disclosed in Patent Document 1, since the surface of the treatment target is covered with a coating film including resin, the surface can be successfully made hydrophilic, however useful surface properties of the treatment target are damaged in the process.

The present invention has been made considering the above-mentioned problems, and has an object to provide a surface treatment liquid capable of successfully making a surface of a treatment target hydrophilic or hydrophobic even without including resin having a coating film formation property, and a surface treatment method using such a surface treatment liquid.

The present inventors have found that the above-mentioned problems can be solved when a surface treatment liquid including (A) resin and a (C) solvent, wherein resin having a functional group I that is at least one group selected from the group consisting of a hydroxyl group, a cyano group, and a carboxyl group, and a functional group II that is a hydrophilic group or a hydrophobic group other than the functional group I is used as the (A) resin, and (B) strong acid having a pKa of 1 or less is added to the surface treatment liquid, thereby arriving at completion of the present invention.

A first aspect of the present invention is a surface treatment liquid including (A) resin, (B) strong acid, and a (C) solvent,
wherein the (A) resin includes a functional group I that is at least one group selected from the group consisting of a hydroxyl group, a cyano group, and a carboxyl group, as well as a functional group II that is a hydrophilic group or a hydrophobic group other than the functional group I,
wherein when the functional group II includes at least one group selected from a hydroxyl group, a cyano group, and a carboxyl group, the (A) resin may not include the functional group I; and
the (B) strong acid has a pKa of 1 or less.

A second aspect of the present invention is a surface treatment method including applying the surface treatment liquid according to the first aspect to a surface of a treatment target.

The present invention can provide a surface treatment liquid capable of successfully making a surface of a treatment target hydrophilic or hydrophobic even without including resin having a coating film formation property, and provide a surface treatment method using such a surface treatment liquid.

DETAILED DESCRIPTION OF THE INVENTION

«Surface Treatment Liquid»

A surface treatment liquid (hereinafter, also simply referred to as a "treatment liquid") includes (A) resin, (B) strong acid, and a (C) solvent. The (A) resin includes a functional group I that is at least one group selected from the group consisting of a hydroxyl group, a cyano group, and a carboxyl group, and a functional group II that is a hydrophilic group or a hydrophobic group other than the functional group I. Note here that when the functional group II includes at least one group selected from a hydroxyl group, a cyano group, and a carboxyl group, the (A) resin may not include the functional group I. The (B) strong acid has a pKa of 1 or less.

When the treatment liquid includes (A) resin having a functional group I, and (B) strong acid having a pKa of 1 or less, the (A) resin is successfully bonded or attached to a surface of a treatment target at the time of surface treatment. Therefore, a hydrophilic or hydrophobic functional group II of the (A) resin is introduced to the surface of the treatment target with high efficiency. As a result, when surface treatment is carried out using a treatment liquid including (A) resin and (B) strong acid, the surface of the treatment target is made hydrophilic or hydrophobic to a high degree.

Hereinafter, essential or optional components included in a treatment liquid are described.

<(A) Resin>

(A) Resin has a functional group I that is at least one group selected from the group consisting of a hydroxyl group, a cyano group, and a carboxyl group. Since (B) strong acid enhances the reaction or interaction between the functional group I and a surface of a treatment target, the (A) resin is bonded or attached to the surface of the substrate.

The (A) resin has a functional group II that is a hydrophilic group or a hydrophobic group other than the functional group I. Use of a treatment liquid including (A) resin having a hydrophilic group allows for a hydrophilic treatment; and use of a treatment liquid including (A) resin having a hydrophobic group allows for a hydrophobic treatment. The hydrophilic group or hydrophobic group is not particularly limited, and may be selected appropriately from functional groups which have been conventionally recognized as hydrophilic groups or hydrophobic groups by a person skilled in the art.

Types of the (A) resin are not particularly limited as long as the (A) resin has a predetermined functional group, and is soluble to a (C) solvent. Examples of the (A) resin include (meth)acrylic resin, novolac resin, polyester resin, polyamide resin, polyimide resin, polyamide-imide resin, silicone resin, and the like. Among such resin, (meth)acrylic resin is preferable because of easiness in insertion of a functional group, and adjustment of the content ratio of units each having a functional group.

Specific examples of the hydrophilic group include a polyoxyalkylene group (for example, a polyoxyethylene group, a polyoxypropylene group, a polyoxyalkylene group in which an oxyethylene group is block-bonded or randomly-bonded to an oxypropylene group, and the like), an amino group, a carboxyl group, a hydroxyl group, a sulfonic acid group, and the like. Furthermore, an organic group including these groups is preferable as the hydrophilic group.

When the (A) resin has a hydrophilic group or a hydrophobic group including a hydroxyl group, a cyano group, and a carboxyl group as the functional group II, the hydroxyl group, the cyano group, or the carboxyl group included in the hydrophilic group or the hydrophobic group also serves as the functional group I. Therefore, when the (A) resin has a hydrophilic group or a hydrophobic group including a hydroxyl group, a cyano group, and a carboxyl group as the functional group II, the (A) resin may not have the functional group I.

Note here that the hydrophilic group including a hydroxyl group and a carboxyl group includes the hydroxyl group itself and the carboxyl group itself.

From the viewpoint that an excellent hydrophilic effect is achieved, as the hydrophilic group, a group represented by the following formula (A1):

—NH—R¹ (A1)

(in the formula (A1), R¹ represents an alkyl group having 1 to 4 carbon atoms substituted with at least one group selected from the group consisting of an amino group, a sulfonic acid group and a hydroxyl group, or a hydrogen atom) is preferable.

Specific examples of the hydrophilic group represented by formula (A1) include an amino group and groups represented by the following formulae.

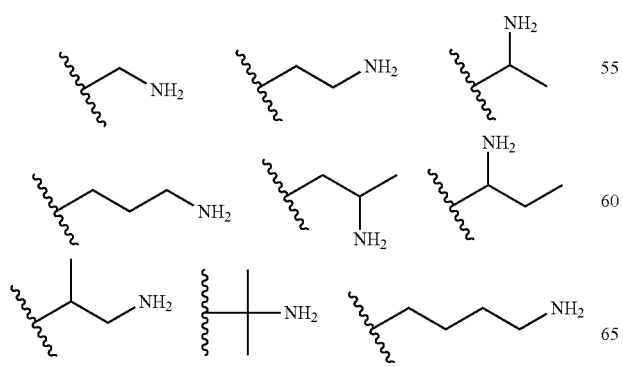

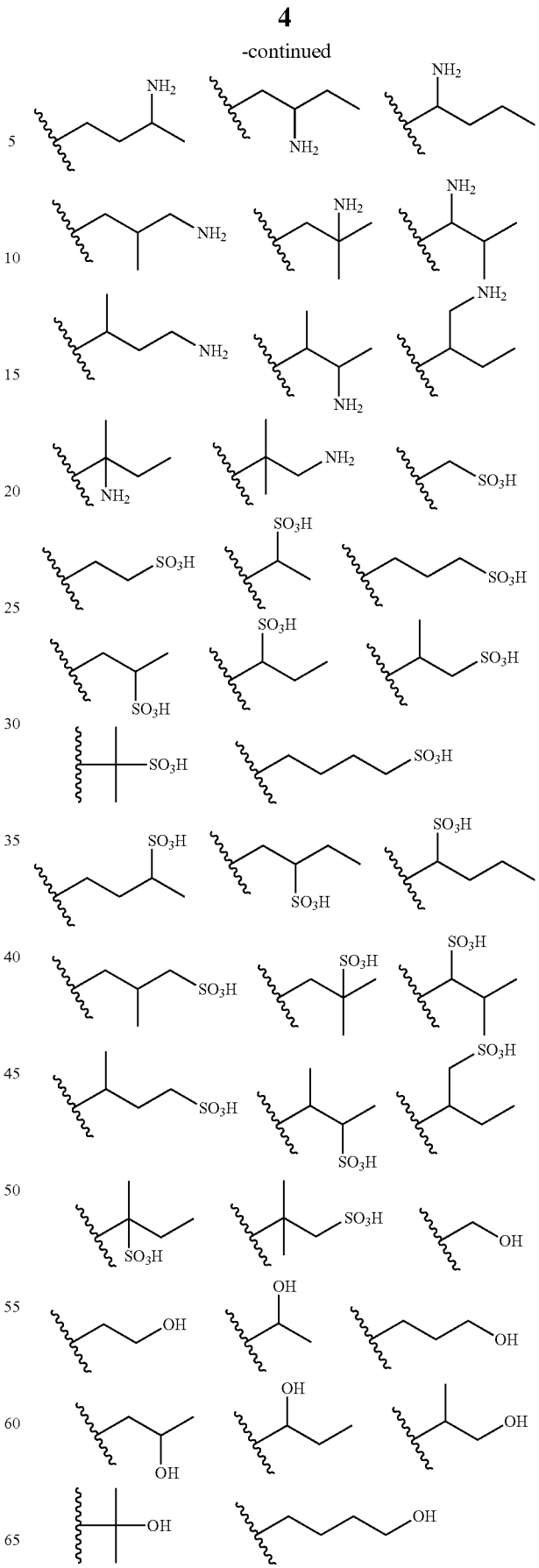

-continued
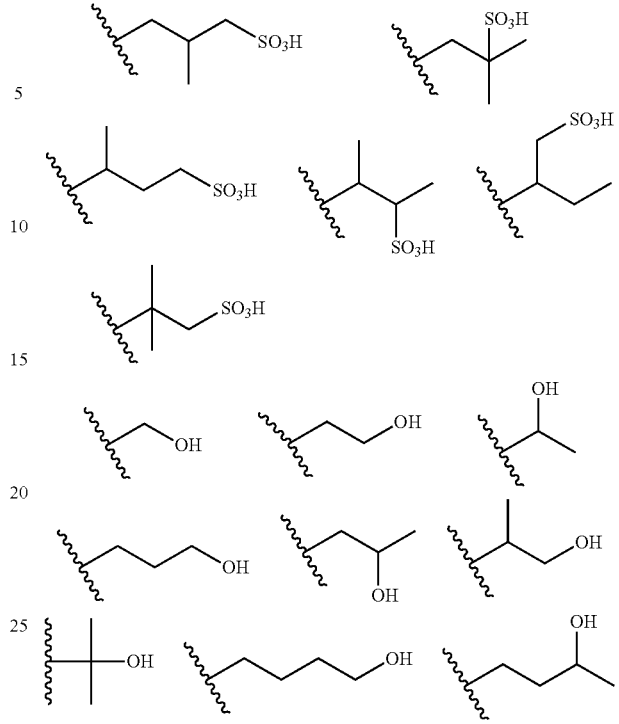
Among the hydrophilic groups represented by the above-described formula (A1), the following groups are more preferable.
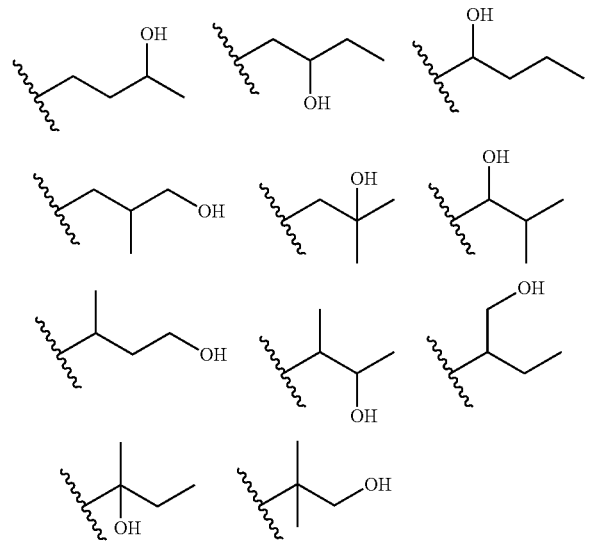
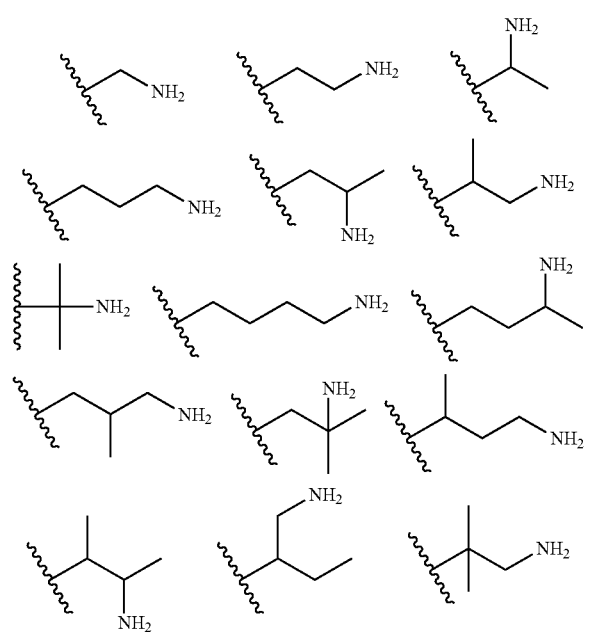
Among the hydrophilic groups represented by the above-described formula (A1), the following groups are particularly preferable.
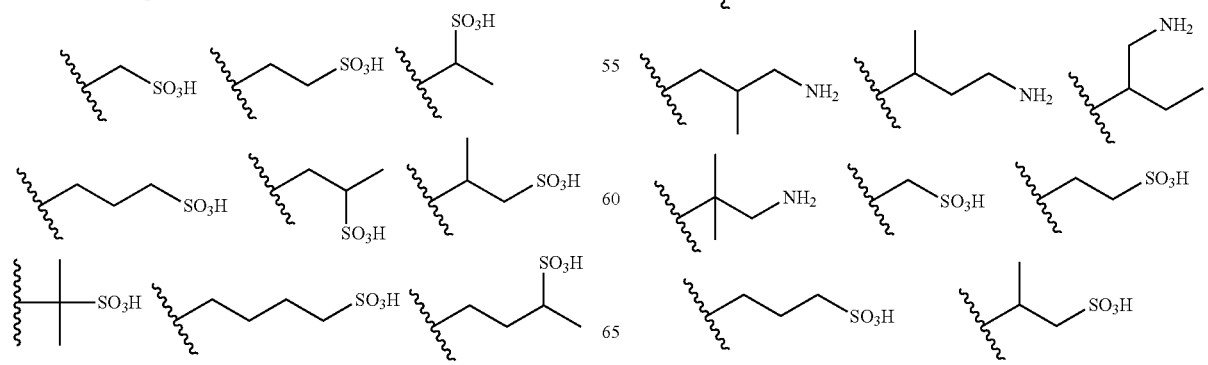

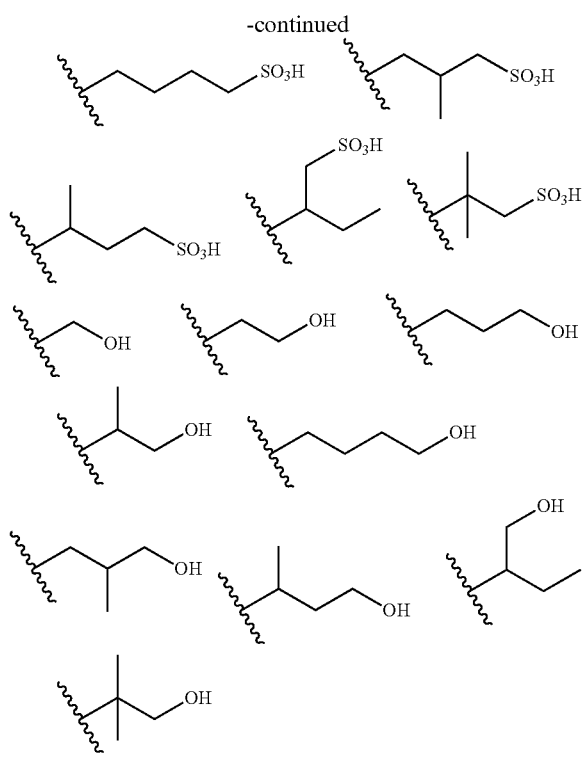

Specific examples of the hydrophobic group include a fluorinated hydrocarbon group, a silyl group, a siloxane group, an alkyl group having 6 to 20 carbon atoms, and an aromatic hydrocarbon group having 10 to 20 carbon atoms, and the like. As the fluorinated hydrocarbon group, the groups represented by the formula (A3) (to be described later) are preferable. Preferable examples of the silyl group include groups represented by the formula (A4) to be described later, wherein n is 0. Specific examples of the silyl group include a trimethylsilyl group, a triethyl silyl group, a tripropyl silyl group, a triisopropyl silyl group, a tert-butyl dimethyl silyl group, a triphenyl silyl group, and the like. Preferable examples of the siloxane group include groups represented by the formula (A4) to be described later, wherein n is 1 or more.

As the (A) resin, a monomer-polymer having an unsaturated bond is preferable from the viewpoint that various functional groups are easily introduced and the amount of functional groups is easily adjusted. Such a polymer may be a homopolymer or a copolymer.

In this case, the functional group I of the (A) resin is preferably a group derived from a monomer represented by the following formula (A2):

$$CH_2=CR^2—(R^3)_a—CO—R^4 \quad (A2)$$

(in the formula (A2), $R^2$ is a hydrogen atom or a methyl group, $R^3$ is a divalent hydrocarbon group, a is 0 or 1, $R^4$ is —OH, —O—$R^5$, or —NH—$R^5$, $R^5$ is a hydrocarbon group substituted with at least one functional group selected from the group consisting of a hydroxyl group, a cyano group, and a carboxyl group).

In the above-described formula (A2), $R^3$ is a divalent hydrocarbon group. The number of carbon atoms of the divalent hydrocarbon group is not particularly limited, within a range in which the object of the present invention is not impaired. From the viewpoint that the (A) resin is easily obtained or prepared, the number of carbon atoms of the divalent hydrocarbon group as $R^3$ is preferably 1 to 20, more preferably 1 to 12, particularly preferably 1 to 10, and most preferably 1 to 6.

The divalent hydrocarbon group as $R^3$ may be an aliphatic group, an aromatic group, and a hydrocarbon group including an aliphatic moiety and an aromatic moiety. When the divalent hydrocarbon group is an aliphatic group, the aliphatic group may be a saturated aliphatic group or an unsaturated aliphatic group. Furthermore, a structure of the aliphatic group may be a linear, branched, or cyclic group, or combination of these groups.

Specific examples of $R^3$ include a methylene group, an ethane-1,2-diyl group, an ethane-1,1-diyl group, a propane-1,3-diyl group, a propane-1,1-diyl group, a propane-2,2-diyl group, an n-butane-1,4-diyl group, an n-pentane-1,5-diyl group, an n-hexane-1,6-diyl group, an n-heptane-1,7-diyl group, an n-octane-1,8-diyl group, an n-nonane-1,9-diyl group, an n-decane-1,10-diyl group, an o-phenylene group, an m-phenylene group, a p-phenylene group, a naphthalene-2,6-diyl group, a naphthalene-2,7-diyl group, a naphthalene-1,4-diyl group, a biphenyl-4,4'-diyl group, and the like.

$R^4$ is —OH, —O—$R^5$, or —NH—$R^5$; and $R^5$ is a hydrocarbon group substituted with at least one functional group selected from the group consisting of a hydroxyl group, a cyano group, and a carboxyl group. The hydrocarbon group constituting a main skeleton of the group of $R^5$ may be a linear, branched, or cyclic aliphatic group, or an aromatic hydrocarbon group. The number of carbon atoms of the linear, branched, or cyclic aliphatic group is preferably 1 to 20, and more preferably 1 to 12. Preferable examples of the linear or branched aliphatic group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a sec-pentyl group, a tert-pentyl group, an n-hexyl group, an n-heptyl group, an n-octyl group, an n-nonyl group, an n-decyl group, and the like. Preferable examples of the cyclic aliphatic group include cycloalkyl groups such as a cyclopropyl group, a cyclobutyl group, a cyclopentyl group, a cyclohexyl group, a cycloheptyl group, and a cyclooctyl group; a group in which one hydrogen atom is removed from polycycloalkane such as adamantane, norbornane, isobornane, tricyclodecane, and tetracyclododecane, or a group in which one hydrogen atom is removed from C1-C4 alkyl substitute of these polycycloalkanes. Preferable examples of the aromatic hydrocarbon group include a phenyl group, a naphthyl group, an anthranil group, a phenanthrenyl group, and a biphenylyl group, and the like. The aromatic hydrocarbon group may be substituted with a C1-C4 alkyl group such as a methyl group and an ethyl group.

Particularly preferable specific examples of the unit derived from a monomer represented by formula (A2) include the following units a2-1 to a2-9. Among the following units a2-1 to a2-9, units a2-1 to a2-4 are more preferable.

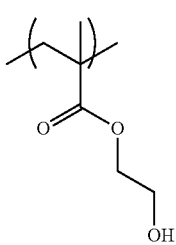

a2-1

-continued

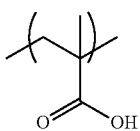
a2-2

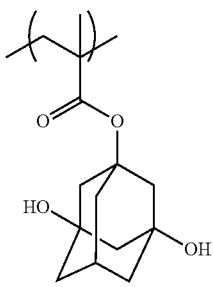
a2-3

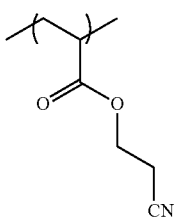
a2-4

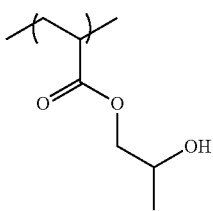
a2-5

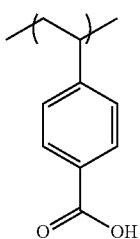
a2-6

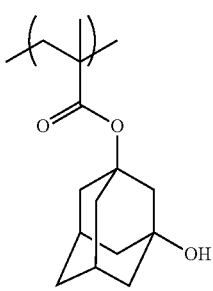
a2-7

-continued

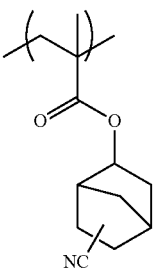
a2-8

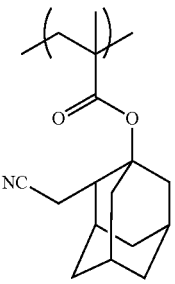
a2-9

When the (A) resin has a hydrophobic group as the functional group II, the functional group II is preferably derived from the monomer represented by the following formula (A3):

$$CH_2=CR^2-(CO-O)_b-R^6 \quad (A3)$$

(in the formula (A3), $R^2$ is a hydrogen atom or a methyl group, b is 0 or 1, and $R^6$ is a fluorinated hydrocarbon group or a group represented by the following formula (A4):

$$-SiR^7R^8-(-O-SiR^7R^8-)_n-R^9 \quad (A4)$$

wherein $R^7$, $R^8$, and $R^9$ are, each independently, a hydrocarbon group having 1 to 6 carbon atoms, and n is an integer of 0 or more).

In the formula (A3), when $R^6$ is a fluorinated hydrocarbon group, the hydrocarbon group constituting a main skeleton of the fluorinated hydrocarbon group is similar to the hydrocarbon group constituting the main skeleton of the above-described group of $R^5$. The fluorinated hydrocarbon group may be a group in which all the hydrogen atoms of the hydrocarbon group are substituted with a fluorine atom. Specific examples of the fluorinated hydrocarbon group as $R^6$ include chain fluorinated alkyl groups such as $-CF_3$, $-CF_2CF_3$, $-(CF_2)_2CF_3$, $-(CF_2)_3CF_3$, $-(CF_2)_4CF_3$, $-(CF_2)_5CF_3$, $-(CF_2)_6CF_3$, $-(CF_2)_7CF_3$, $-(CF_2)_8CF_3$, $-(CF_2)_9CF_3$, $-CH_2CF_3$, $-CH_2CF_2CF_3$, $-CH_2(CF_2)_2CF_3$, $-CH_2(CF_2)_3CF_3$, $-CH_2(CF_2)_4CF_3$, $-CH_2(CF_2)_5CF_3$, $-CH_2(CF_2)_6CF_3$, $-CH_2(CF_2)_7CF_3$, $-CH_2(CF_2)_8CF_3$, $-CH_2CH_2CF_3$, $-CH_2CH_2CF_2CF_3$, $-CH_2CH_2(CF_2)_2CF_3$, $-CH_2CH_2(CF_2)_3CF_3$, $-CH_2CH_2(CF_2)_4CF_3$, $-CH_2CH_2(CF_2)_5CF_3$, $-CH_2CH_2(CF_2)_6CF_3$, $-CH_2CH_2(CF_2)_7CF_3$, and $-CH(CF_3)_2$; fluorinated aromatic hydrocarbon groups such as a pentafluorophenyl group, an o-trifluoromethyl phenyl group, an m-trifluoromethyl phenyl group, and a p-trifluoromethyl phenyl group; fluorinated alicyclic groups such as an octafluoroadamanthyl group, and the like.

In the formula (A3), when $R^6$ is a group represented by the formula (A4), it is preferable that $R^7$, $R^8$, and $R^9$ are, each independently, a methyl group, an ethyl group, or a phenyl group, and more preferable that all of $R^7$, $R^8$, and $R^9$ are a methyl group. In the formula (A4), the upper limit of n is not particularly limited within a range in which the object of the present invention is not impaired.

"n" is preferably an integer between 0 and 35 inclusive, and more preferably an integer between 0 and 10 inclusive.

Particularly preferable specific examples of the unit having a hydrophobic group derived from a monomer represented by the formula (A3) include the units of the following a3-1 to a3-22. In the following units, units a3-8, a3-18, a3-19, and a3-22 are preferable.

a3-1

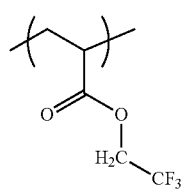

a3-2 a3-3

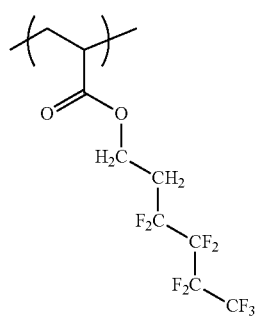

a3-4

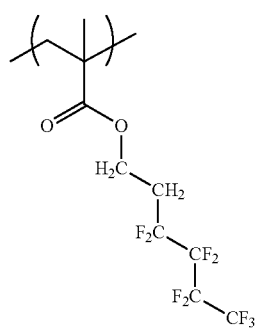

a3-5

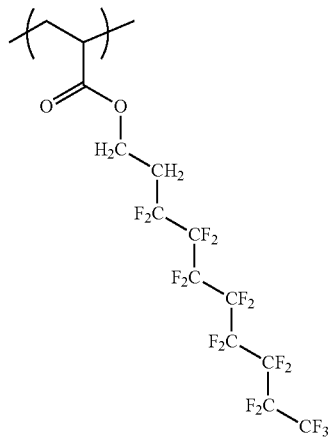

a3-6

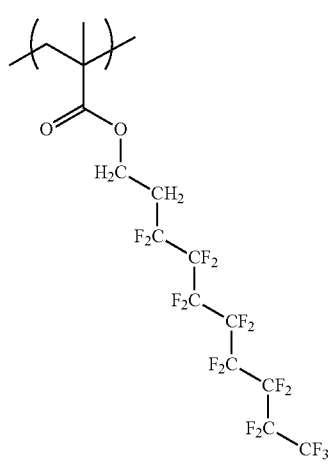

a3-7

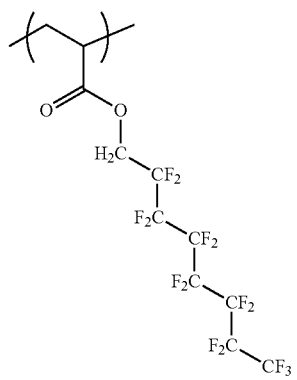

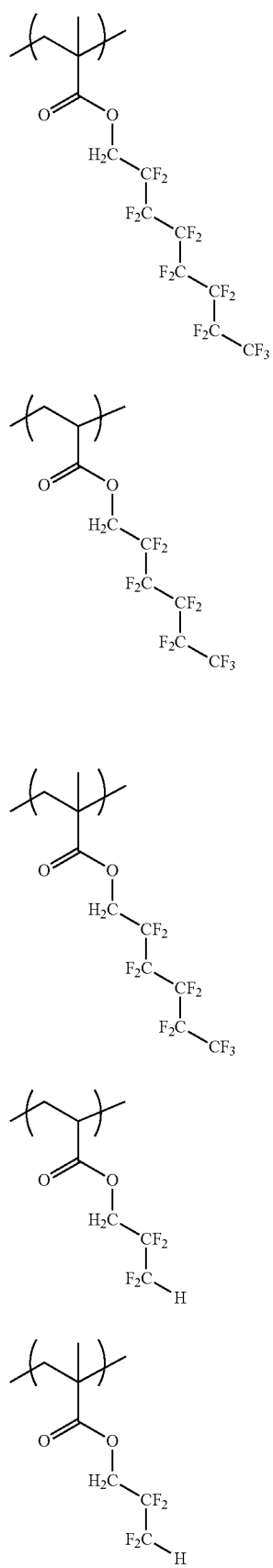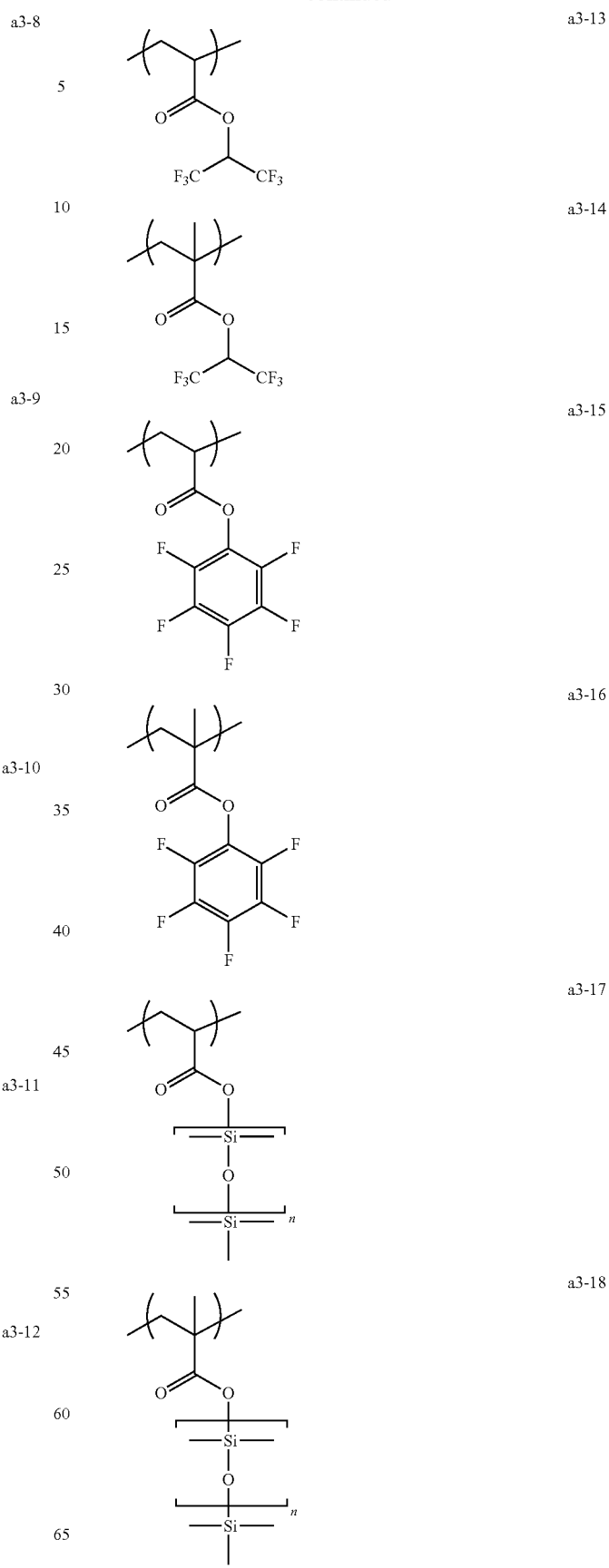

-continued

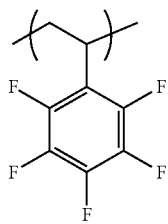
a3-19

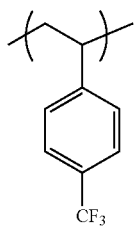
a3-20

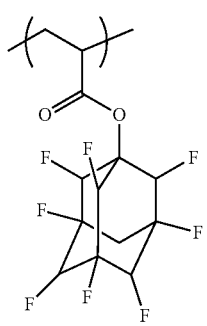
a3-21

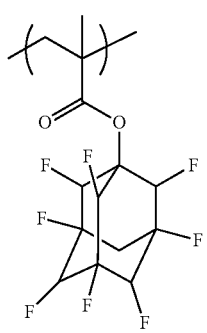
a3-22

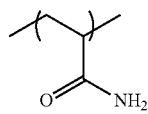
a5-1

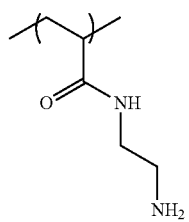
a5-2

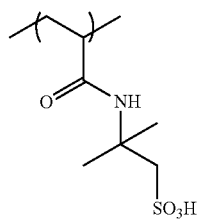
a5-3

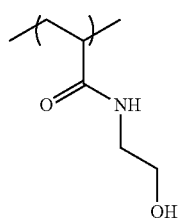
a5-4

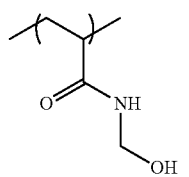
a5-5

Furthermore, when the (A) resin has a hydrophilic group as the functional group II, the functional group II is preferably derived from a monomer represented by the following formula (A5):

$$CH_2=CR^2-CO-NH-R^1 \quad (A5)$$

(in the formula (A5), $R^1$ is an alkyl group having 1 to 4 carbon atoms substituted with at least one group selected from the group consisting of an amino group, a sulfonic acid group, and a hydroxyl group, or a hydrogen atom; and $R^2$ is a hydrogen atom or a methyl group).

In the formula (A5), $R^1$ is the same as described above.

Particularly preferable specific examples of the unit having a hydrophilic group derived from a monomer represented by the formula (A5) include the following units a5-1 to a5-5. Among the units, units a5-1 to a5-4 are more preferable.

When the (A) resin is a monomer-polymer having an unsaturated bond, such a polymer may include constituent units other than the unit derived from the monomer represented by the formula (A2), the unit derived from the monomer represented by the formula (A3), and the unit derived from the monomer represented by the formula (A5) described above, within a range in which the object of the present invention is not impaired.

Examples of the other constituent units include constituent units derived from monomers such as methyl(meth)acrylate, ethyl(meth)acrylate, isopropyl(meth)acrylate, n-propyl(meth)acrylate, n-butyl(meth)acrylate, isobutyl (meth)acrylate, tert-butyl(meth)acrylate, n-pentyl (meth) acrylate, isopentyl(meth)acrylate, phenyl(meth)acrylate, N-methyl(meth)acrylamide, N-ethyl(meth)acrylamide, N-n-propyl(meth)acrylamide, N-isopropyl(meth)acrylamide, N-n-butyl(meth)acrylamide, N-n-pentyl(meth)acrylamide, N-isopentyl(meth)acrylamide, N-phenyl(meth)acrylamide, N,N-dimethyl(meth)acrylamide, N,N-diethyl(meth)acrylamide, N,N-di-n-propyl(meth)acrylamide, N,N-di-n-butyl (meth)acrylamide, N,N-di-n-pentyl(meth)acrylamide, styrene, α-methyl styrene, β-methyl styrene, o-methyl styrene, m-methyl styrene, p-methyl styrene, and chlorostyrene.

When the (A) resin is a monomer-polymer having an unsaturated bond, the mole ratio of constituent units derived from the monomer represented by the formula (A2) in the total constituent units included in such a polymer is preferably 0.1 to 50 mol %, more preferably 1 to 20 mol %, and particularly preferably 1 to 15 mol %.

When the (A) resin is a monomer-polymer having an unsaturated bond, the mole ratio of constituent units derived from the monomers represented by the formula (A3) or (A5) in the total constituent units is preferably 50 to 99.9 mol %, more preferably 60 to 99 mol %, and particularly preferably 70 to 99 mol %. However, when the constituent units derived from the monomer represented by formula (A5) include any one group of a hydroxyl group, a cyano group, and a carboxyl group, the ratio of constituent units derived from the monomer represented by formula (A5) in the total constituent units included in the polymer may be 100%.

The amount of the resin (A) included in the treatment liquid is not particularly limited within a range in which the object of the present invention is not impaired, and the amount can be appropriately determined considering the application property of the treatment liquid. Typically, the amount of the resin (A) in the treatment liquid preferably has the following relationship with respect to the amount of a (C) solvent to be described later. When the mass of the resin in the treatment liquid is 100 parts by mass, the amount of the (C) solvent (to be described later) is preferably 100 to 10000 parts by mass, more preferably 500 to 8000 parts by mass, and particularly preferably 1000 to 6000 parts by mass.

<(B) Strong Acid>

A treatment liquid includes (B) strong acid. The (B) strong acid has a pKa of 1 or less. Note here that the pKa is a value in water. The (B) strong acid acts on a functional group I of (A) resin, thereby promoting attachment or bonding of the (A) resin to a surface of a treatment target. Types of the (B) strong acid are not particularly limited as long as they have a pKa of 1 or less. As the (B) strong acid, it is possible to use two or more acids having a pKa of 1 or less in combination.

Preferable examples of the (B) strong acid include fluorinated aliphatic carboxylic acid (for example, trifluoroacetic acid, and the like), fluorosulfonic acid, alkane sulfonic acid having 1 to 30 carbon atoms (for example, methane sulfonic acid, dodecane sulfonic acid, and the like), aryl sulfonic acid (for example, benzene sulfonic acid, p-toluene sulfonic acid, and the like), fluoroalkane sulfonic acid having 1 to 30 carbon atoms (for example, trifluoromethane sulfonic acid, pentafluoroethane sulfonic acid, heptafluoropropane sulfonic acid, nonafluorobutane sulfonic acid, undecafluoropentane sulfonic acid, and tridecafluorohexane sulfonic acid), a bis(sulfonyl)imide compound, a cyclic sulfonylimide compound in which two sulphonyl groups are linked to each other by a fluoroalkylene group, N-acyl fluoroalkane sulfonic acid amide, and the like.

When these (B) strong acids include a fluoroalkyl group or a fluoroalkylene group, such a group may be a partially fluorinated fluoroalkyl group or fluoroalkylene group, a completely fluorinated perfluoroalkyl group or perfluoroalkylene group.

Among these (B) strong acids, fluorosulfonic acid, alkane sulfonic acid having 1 to 30 carbon atoms, fluoroalkane sulfonic acid having 1 to 30 carbon atoms, bis(fluoroalkylsulphonyl)imidic acid, cyclic sulfone imidic acid in which two sulphonyl groups are linked to each other by a fluoroalkylene group, and N-acyl fluoroalkane sulfonic acid amide are preferable; and fluoroalkane sulfonic acid having 1 to 30 carbon atoms, a bis(sulfonyl)imide compound, a cyclic sulfonylimide compound in which two sulphonyl groups are linked to each other by a fluoroalkylene group, and N-acyl fluoroalkane sulfonic acid amide are preferable.

As fluoroalkane sulfonic acid having 1 to 30 carbon atoms, trifluoromethane sulfonic acid, pentafluoroethane sulfonic acid, heptafluoropropane sulfonic acid, nonafluorobutane sulfonic acid, and the like, are preferable.

As the bis(sulfonyl)imide compound, a compound represented by the following formula (B1) is preferable.

(B1)

In the formula (B1), $X^1$ and $X^2$, each independently, represent a hydrocarbon group substituted with at least one electron-withdrawing group. The hydrocarbon group may be substituted with various groups other than the electron-withdrawing group within a range in which the strong acidity of the compound represented by the formula (B1) is not impaired. The number of carbon atoms of $X^1$ and $X^2$ is preferably 1 to 20, more preferably 1 to 10, and particularly preferably 1 to 7. As the hydrocarbon group substituted with an electron-withdrawing group, a fluorinated alkyl group and an aryl group having a nitro group are preferable. The fluorinated alkyl group may be linear, branched or cyclic. As the fluorinated alkyl group, a completely fluorinated perfluoroalkyl group is preferable. As the aryl group having a nitro group, an o-nitrophenyl group, an m-nitrophenyl group, and a p-nitrophenyl group are preferable, and a p-nitrophenyl group is more preferable.

Specific examples of the compound represented by formula (B1) include compounds of the following formula.

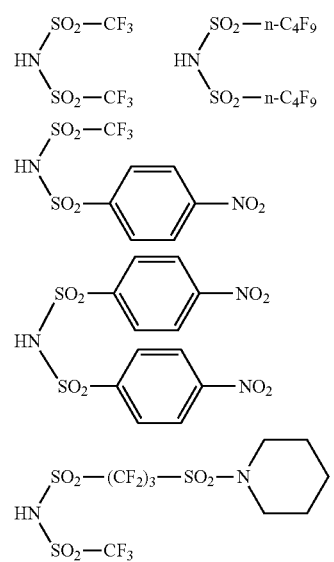

As the cyclic sulfonyl imide compound in which two sulphonyl groups are linked to each other by a fluoroalkylene group, a compound represented by the following formula (B2) is preferable.

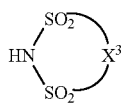
(B2)

In the formula (B2), $X^3$ represents a linear or branched alkylene group in which at least one hydrogen atom is substituted with a fluorine atom. The number of carbon atoms of $X^3$ is preferably 2 to 6, more preferably 3 to 5, and particularly preferably 3.

Preferable specific examples of the compound represented by formula (B2) include compounds of the following formula.

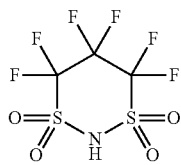

As N-acyl fluoroalkane sulfonic acid amide, a compound represented by the following formula (B3) is preferable.

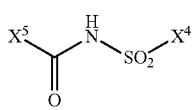
(B3)

In the formula (B3), $X^4$ represents a linear or branched alkyl group in which at least one hydrogen atom is substituted with a fluorine atom. The number of carbon atoms in $X^4$ is preferably 1 to 10, more preferably 1 to 7, and particularly preferably 1 to 3. $X^5$ is a hydrocarbon group. The hydrocarbon group is similar to the hydrocarbon group constituting a main skeleton of the group of $R^5$.

Preferable specific examples of the compound represented by formula (B3) include the compounds of the following formula.

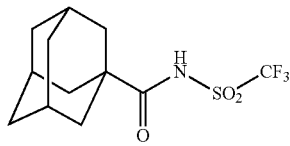

The content of the (B) strong acid in the treatment liquid is not particularly limited as long as the surface treatment by a treatment liquid can be successfully carried out. The content of the (B) strong acid in the treatment liquid is preferably 0.1 to 20 parts by mass, more preferably 0.1 to 10 parts by mass, and particularly preferably 0.1 to 5 parts by mass with respect to 100 parts by mass of the (A) resin.

<(C) Solvent>

A (C) solvent is not particularly limited as long as it can dissolve (A) resin and (B) strong acid. As long as predetermined amounts of (A) resin and (B) strong acid are dissolved in the treatment liquid, the treatment liquid may include (A) resin and (B) strong acid which have not been dissolved. It is preferable that (A) resin and (B) strong acid are completely dissolved in the treatment liquid. When the treatment liquid include insoluble matter, the insoluble matter may be attached to a surface of a treatment target at the time of surface treatment. In this case, the surface-treated surface of the treatment target is rinsed with a method to be described later, and thereby it is possible to remove the insoluble matter attached to the surface of the treatment target.

The (C) solvent may be water, an organic solvent, or an aqueous solution of an organic solvent.

Specific examples of the organic solvent used as the (C) solvent include:

sulfoxides such as dimethylsulfoxide;

sulfones such as dimethylsulfone, diethylsulfone, bis(2-hydroxyethyl)sulfone, and tetramethylene sulfone;

amides such as N,N-dimethylformamide, N-methylformamide, N,N-dimethylacetamide, N-methylacetamide, and N,N-dimethylacetamide;

lactams such as N-methyl-2-pyrrolidone, N-ethyl-2-pyrrolidone, N-propyl-2-pyrrolidone, N-hydroxymethyl-2-pyrrolidone, and N-hydroxyethyl-2-pyrrolidone;

imidazolidinones such as 1,3-dimethyl-2-imidazolidinone, 1,3-diethyl-2-imidazolidinone, and 1,3-diisopropyl-2-imidazolidinone;

dialkyl glycol ethers such as dimethyl glycol, dimethyl diglycol, dimethyl trigylcol, methylethyl diglycol, diethyl glycol, and triethylene glycol butyl methyl ether;

(poly)alkylene glycol monoalkyl ethers such as ethylene glycol monomethyl ether, ethylene glycol monoethyl ether, ethylene glycol mono-n-propyl ether, ethylene glycol mono-n-butyl ether, diethylene glycol monomethyl ether, diethylene glycol monoethyl ether, diethylene glycol mono-n-propyl ether, diethylene glycol mono-n-butyl ether, triethylene glycol monomethyl ether, triethylene glycol monoethyl ether, propylene glycol monomethyl ether, propylene glycol monoethyl ether, propylene glycol mono-n-propyl ether, propylene glycol mono-n-butyl ether, dipropylene glycol monomethyl ether, dipropylene glycol monoethyl ether, dipropylene glycol mono-n-propyl ether, dipropylene glycol mono-n-butyl ether, tripropylene glycol monomethyl ether, and tripropylene glycol monoethyl ether;

(poly)alkylene glycol monoalkyl ether acetates such as ethylene glycol monomethyl ether acetate, ethylene glycol monoethyl ether acetate, diethylene glycol monomethyl ether acetate, diethylene glycol monoethyl ether acetate, propylene glycol monomethyl ether acetate, and propylene glycol monoethyl ether acetate;

other ethers such as dimethyl ether, diethyl ether, methylethyl ether, dipropyl ether, diisopropyl ether, dibutyl ether, diisoamyl ether, diethylene glycol dimethyl ether, diethylene glycol methylethyl ether, diethylene glycol diethyl ether, and tetrahydrofuran;

ketones such as methyl ethyl ketone, cyclohexanone, 2-heptanone, and 3-heptanone;

alkyl lactate esters such as methyl 2-hydroxypropionate and ethyl 2-hydroxypropionate; other esters such as 2-hydroxy-2-methylpropionic acid ethyl, 3-methoxypropionic acid methyl, 3-methoxypropionic acid ethyl, 3-ethoxypropionic acid methyl, 3-ethoxypropionic acid ethyl, ethoxy acetic acid ethyl, hydroxyl acetic acid ethyl, 2-hydroxy-3-methylbutanoic acid methyl, 3-methyl-3-methoxybutyl acetate, 3-methyl-3-methoxybutyl propionate, ethyl acetate, n-propyl acetate, i-propyl acetate, n-butyl acetate, i-butyl acetate, n-pentyl formate, i-pentyl acetate, n-butyl propionate, ethyl butyrate, n-propyl butyrate, i-propyl butyrate, n-butyl butyrate, methyl pyruvate, ethyl pyruvate, n-propyl pyruvate, methyl acetoacetate, ethyl acetoacetate, and ethyl 2-oxobutanoate;

lactones such as β-propiolactone, γ-butyrolactone, and δ-pentyrolactone;

linear, branched, or cyclic aliphatic hydrocarbons such as n-hexane, n-heptane, n-octane, n-nonane, methyloctane, n-decane, n-undecane, n-dodecane, 2,2,4,6,6-pentamethyl heptane, 2,2,4,4,6,8,8-heptamethyl nonane, cyclohexane, and methyl cyclohexane;

aromatic hydrocarbons such as benzene, toluene, xylene, 1,3,5-trimethyl benzene, and naphthalene;

terpenes such as p-menthane, diphenyl menthane, limonene, terpinene, bornane, norbornane and pinane; and the like.

When the (C) solvent is a mixed solvent of water and an organic solvent, the content of the organic solvent in the (C) solvent is preferably 10 mass % or more, and more preferably 20 mass % or more.

<Other Components>

The treatment liquid may include various components other than (A) resin, (B) strong acid, and (C) solvent, within a range in which the object of the present invention is not impaired. Examples of the other components include a coloring agent, a surface-active agent, a defoaming agent, a viscosity modifier, a surface-active agent, and the like.

<Preparation Method of Treatment Liquid>

A method for preparing a treatment liquid is not particularly limited. The treatment liquid can be typically prepared by homogeneously mixing a predetermined amount of the (A) resin, (B) strong acid, and a (C) solvent, and the other components if necessary.

The above-described treatment liquid is suitably used for, for example, surface treatment for preventing cell adhesion to a cell culture instrument and a micro channel device or the like for circulating a liquid including biological samples such as cells, and surface treatment for the purpose of providing various articles with an antifouling property, an antifog property, or the like.

«Surface Treatment Method»

The surface treatment method using the above-described surface treatment liquid usually includes applying a surface treatment liquid to a surface of a treatment target. The applying method of the surface treatment liquid is not particularly limited. Specific examples of the applying method include a spin coating method, a spray method, a roller coating method, a dipping method, and the like. When the treatment target is a substrate, since uniform application of the surface treatment liquid allows a surface of the substrate to be uniformly hydrophilic or hydrophobic, a spin coating method is preferable as an applying method.

Material for the surface of the treatment target to which a surface treatment liquid is to be applied is not particularly limited, and the material may be an organic material or an inorganic material. Examples of the organic material include various resin materials including polyester resin such as PET resin and PBT resin; various nylon; polyimide resin; polyamide-imide resin; polyolefin such as polyethylene and polypropylene; polystyrene; (meth)acrylic resin; and the like. Furthermore, photosensitive resin components included in various resist material, and alkali soluble resin components are also preferable as the organic material. Examples of the inorganic material include glass, silicon, and various metal such as copper, aluminum, iron and tungsten. The metal may be an alloy.

Material for surfaces to be surface-treated by the above-described surface treatment liquid is not particularly limited. However, when the material of a surface to which a surface treatment liquid is applied is an organic material, it is preferable to use a surface treatment liquid including (A) resin having a hydroxyl group and/or a carboxyl group as the functional group I. When the material for a surface to which a surface treatment liquid is applied is an inorganic material, it is preferable to use a surface treatment liquid including (A) resin having a hydroxyl group and/or a cyano group as the functional group I.

Shapes of a treatment target are not particularly limited. The treatment target may be a flat substrate, and may have a three-dimensional shape such as a spherical shape and a columnar shape. Furthermore, the surface of the treatment target may be flat, or may have regular or irregular concavity and convexity.

After the surface treatment liquid is applied to a surface of the treatment target, a coated film may be heated to remove at least part of the (C) solvent, if necessary.

A portion of the treatment target on which the surface treatment liquid is applied is preferably rinsed. As described above, when the surface treatment liquid including (A) resin having a predetermined functional group and (B) strong acid is applied on the surface of the treatment target, the (A) resin is successfully attached or bonded to the surface of the treatment target. However, a certain amount of (A) resin has not been attached or bonded to the surface of the treatment target. Therefore, in order to reduce the influence of the (A) resin on the surface property of the treatment target to a maximum extent, it is preferable that the (A) resin which has not been attached or bonded to the surface is washed out by rinsing.

When the surface treatment liquid includes water as the (C) solvent, rinsing with water is preferable. Furthermore, when the surface treatment liquid includes an organic solvent as the (C) solvent, rinsing with an organic solvent is also preferable. When rinsing with an organic solvent, it is preferable to use an organic solvent of the same type as the organic solvent contained in the surface treatment liquid.

After the surface treatment liquid is applied or rinsed, the surface of the treatment target is dried, thereby obtaining an article, which has been successfully made hydrophilic or hydrophobic.

EXAMPLES

Hereinafter, the present invention will be explained more specifically by way of Examples, but the present invention is not limited to the following Examples.

Examples 1 to 16 and Comparative Examples 1 to 6

In each Example and Comparative Example, resin containing the constituent units (to be described below) in the ratios listed in Table 1 was used as (A) resin. Units A-1 to A-7 are constituent units for introducing a functional group II as a hydrophilic group or a hydrophobic group into the (A) resin. Units B-1 to B-4 are constituent units for introducing a functional group I into the (A) resin. Units C-1 to C-3 are constituent units having none of the functional groups I and II.

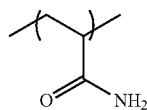

A-1

-continued
A-2 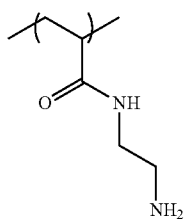
A-3 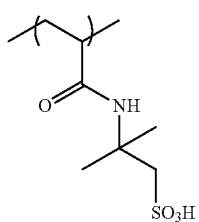
A-4 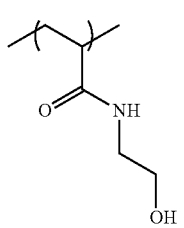
A-5 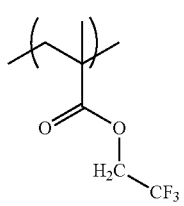
A-6 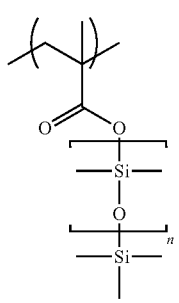
A-7 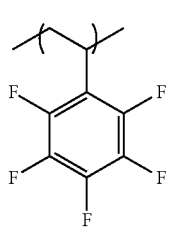
B-1 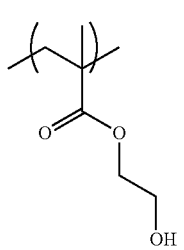
B-2 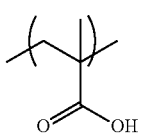
B-3 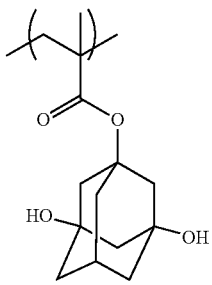
B-4 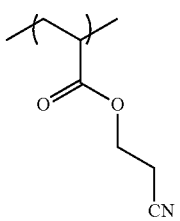
C-1 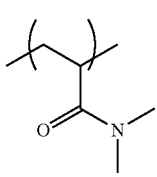
C-2 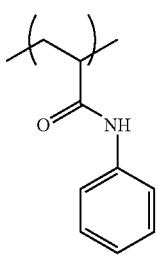
C-3 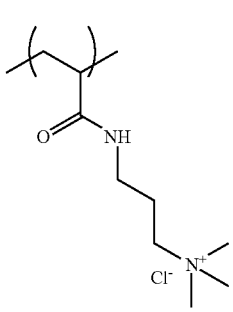
In the Examples and Comparative Examples, the following Ac1 to Ac4 were used as acid components. Ac1 (trifluoromethane sulfonic acid) and a compound of the following formula Ac2 are strong acids having a pKa of 1 or less. Ac3 (phosphoric acid) and Ac4 (acetic acid) are acids having a pKa of more than 1.

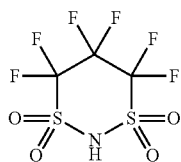
(Ac2)

In the Examples and Comparative Examples, purified water (S1), propylene glycol monomethyl ether (S2), and propylene glycol monomethyl ether acetate (S3) were used as a (C) solvent.

Preparation of Surface Treatment Liquid

A surface treatment liquid of each Example and Comparative Example was obtained by homogeneously mixing 100 parts by mass of (A) resin including constituent units of types and in ratios listed in Tables 1 to 3, an acid component in parts by mass listed in Tables 1 to 3, and a solvent in parts by mass listed in Tables 1 to 3. Note here that, in Comparative Example 1, an acid component was not used.

In Example 8, resin including only unit A-4 was used; and in Example 15, resin including only unit A-1 and unit A-4 were used. The 2-hydroxyethyl amino group included in the unit A-4 is a hydrophilic group and is also a hydroxyl group-containing group. Therefore, the hydroxyl group included in the unit A-4 also serves as the functional group I.

Evaluation of Surface Treatment Effect

Surface treatment of a PET film was carried out with the following method, by using the surface treatment liquids of Examples 1 to 15 and Comparative Examples 1 to 5, which were obtained with the above-described method. Firstly, the surface treatment liquid was applied onto the PET film with a spin coating method to form a coated film having a film thickness of 500 nm. The formed coated film was heated at 40° C. for 60 seconds, followed by rinsing a surface of the PET film. In Examples 1 to 4, Examples 8 to 13, Example 15, and Comparative Examples 1 to 4, rinsing was carried out using purified water. In Examples 5 to 7, Example 14, and Comparative Example 5, rinsing was carried out using propylene glycol monomethyl ether. The rinsed PET film was dried, and then the water contact angle with respect to the surface of the PET film was measured. The water contact angle was measured using Dropmaster 700 (manufactured by Kyowa Interface Science Co., Ltd.) as follows: a pure water droplet (2.0 µL) was dropped onto a surface-treated surface of a substrate, and the contact angle was measured after 10 seconds of dropping. Measurement results of the water contact angles are listed in Table 1 to 3. Note here that the water contact angle with respect to an untreated PET film is 70.6°.

TABLE 1

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Constituent units of (A) resin (mol %) | A-1 | 95 | — | — | — | — | — | — | — |
| | A-2 | — | 95 | — | — | — | — | — | — |
| | A-3 | — | — | 95 | — | — | — | — | — |
| | A-4 | — | — | — | 95 | — | — | — | 100 |
| | A-5 | — | — | — | — | 95 | — | — | — |
| | A-6 | — | — | — | — | — | 95 | — | — |
| | A-7 | — | — | — | — | — | — | 95 | — |
| | B-1 | 5 | 5 | 5 | 5 | 5 | 5 | 5 | — |
| | B-2 | — | — | — | — | — | — | — | — |
| | B-3 | — | — | — | — | — | — | — | — |
| | B-4 | — | — | — | — | — | — | — | — |
| | C-1 | — | — | — | — | — | — | — | — |
| | C-2 | — | — | — | — | — | — | — | — |
| | C-3 | — | — | — | — | — | — | — | — |
| Acid components having a pKa of 1 or less (parts by mass) | Ac1 | 1 | 1 | 1 | 1 | 1 | 1 | 1 | 1 |
| | Ac2 | — | — | — | — | — | — | — | — |
| Acid components having a pKa of more than 1 (parts by mass) | Ac3 | — | — | — | — | — | — | — | — |
| | Ac4 | — | — | — | — | — | — | — | — |
| (C) Solvents (parts by mass) | S1 | 3500 | 3500 | 3500 | 3500 | — | — | — | 3500 |
| | S2 | 1500 | 1500 | 1500 | 1500 | — | — | — | 1500 |
| | S3 | — | — | — | — | 5000 | 5000 | 5000 | — |
| Contact angle of water (°) | | 9.6 | 12.6 | 12 | 13.2 | 105.6 | 110.1 | 113.1 | 12.2 |

TABLE 2

| | | Ex. 9 | Ex. 10 | Ex. 11 | Ex. 12 | Ex. 13 | Ex. 14 | Ex. 15 |
|---|---|---|---|---|---|---|---|---|
| Constituent units of (A) resin (mol %) | A-1 | 95 | 99 | 90 | 94 | — | — | 95 |
| | A-2 | — | — | — | — | — | — | — |
| | A-3 | — | — | — | — | 95 | — | — |
| | A-4 | — | — | — | — | — | — | 5 |
| | A-5 | — | — | — | — | — | 60 | — |
| | A-6 | — | — | — | — | — | 10 | — |
| | A-7 | — | — | — | — | — | 25 | — |
| | B-1 | — | 1 | 10 | 2 | 5 | 5 | — |
| | B-2 | 2.5 | — | — | 2 | — | — | — |
| | B-3 | — | — | — | — | — | — | — |

TABLE 2-continued

|  |  | Ex. 9 | Ex. 10 | Ex. 11 | Ex. 12 | Ex. 13 | Ex. 14 | Ex. 15 |
|---|---|---|---|---|---|---|---|---|
|  | B-4 | 2.5 | — | — | 2 | — | — | — |
|  | C-1 | — | — | — | — | — | — | — |
|  | C-2 | — | — | — | — | — | — | — |
|  | C-3 | — | — | — | — | — | — | — |
| Acid components having a pKa of 1 or less (parts by mass) | Ac1 | 1 | 1 | 1 | 1 | 0.5 | — | 3 |
|  | Ac2 | — | — | — | — | 0.5 | 1 | — |
| Acid components having a pKa of more than 1 (parts by mass) | Ac3 | — | — | — | — | — | — | — |
|  | Ac4 | — | — | — | — | — | — | — |
| (C) Solvents (parts by mass) | S1 | 3500 | 3500 | 3500 | 3500 | 4000 | — | 4000 |
|  | S2 | 1500 | 1500 | 1500 | 1500 | 1500 | — | 1500 |
|  | S3 | — | — | — | — | — | 5000 | — |
| Contact angle of water (°) |  | 10.2 | 9.6 | 13.5 | 14.2 | 12.5 | 108.5 | 10.2 |

TABLE 3

|  |  | Ex. 16 | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|
| Constituent units of (A) Resin (mol %) | A-1 | 95 | 95 | — | — | 95 | — | 100 |
|  | A-2 | — | — | — | — | — | — | — |
|  | A-3 | — | — | — | — | — | — | — |
|  | A-4 | — | — | — | — | — | — | — |
|  | A-5 | — | — | — | — | — | 95 | — |
|  | A-6 | — | — | — | — | — | — | — |
|  | A-7 | — | — | — | — | — | — | — |
|  | B-1 | — | 5 | 5 | 5 | 5 | 5 | — |
|  | B-2 | 5 | — | 5 | — | — | — | — |
|  | B-3 | — | — | — | — | — | — | — |
|  | B-4 | — | — | — | — | — | — | — |
|  | C-1 | — | — | 45 | — | — | — | — |
|  | C-2 | — | — | 45 | — | — | — | — |
|  | C-3 | — | — | — | 95 | — | — | — |
| Acid components having a pKa of 1 or less (parts by mass) | Ac1 | 1 | — | 1 | 1 | — | — | 1 |
|  | Ac2 | — | — | — | — | — | — | — |
| Acid components having a pKa of more than 1 (parts by mass) | Ac3 | — | — | — | — | 1 | — | — |
|  | Ac4 | — | — | — | — | — | 1 | — |
| (C) Solvents (parts by mass) | S1 | 3500 | 3500 | 3500 | 3500 | 3500 | — | 3500 |
|  | S2 | 1500 | 1500 | 1500 | 1500 | 1500 | — | 1500 |
|  | S3 | — | — | — | — | — | 5000 | — |
| Contact angle of water (°) |  | 10.6 | 66.5 | 57.2 | 55.1 | 60.3 | 70.2 | 70.6 |

Examples 1 to 16 show that, when a surface treatment liquid is used, which includes (A) resin having a predetermined functional group, (B) strong acid having a pKa of 1 or less, and a (C) solvent, the surface of the PET film is successfully made hydrophilic or hydrophobic.

Comparative Example 1 shows that, when a surface treatment liquid including (A) resin having a predetermined functional group and a (C) solvent without including an acid component is used, a successful surface treatment effect cannot be achieved. Comparative Examples 2 and 3 show that, even when a PET film is surface-treated with a surface treatment liquid including (A) resin without a hydrophilic group or a hydrophobic group as the functional group II, (B) strong acid having a pKa of 1 or less, and a (C) solvent, the water contact angle with respect to the PET film is not significantly different from that in the untreated state. Comparative Examples 4 and 5 show that, even when the PET film is surface-treated with a surface treatment liquid including (A) resin having a predetermined functional group, an acid component, and a (C) solvent, without including (B) strong acid having a pKa of 1 or less, the water contact angle with respect to the PET film is not significantly different from that in the untreated state. Comparative Example 6 shows that, even when the PET film is surface-treated with a surface treatment liquid including (A) resin without the functional group I, (B) strong acid having a pKa of 1 or less, and a (C) solvent, the water contact angle with respect to the PET film is not significantly different from that in the untreated state.

Example 17, Example 18 and Comparative Example 7

Surface treatment liquids of Examples 17 and 18 and Comparative Example 7 were obtained by homogeneously mixing 100 parts by mass of (A) resin including the mole ratio of constituent units and types listed in Table 4, acid components in parts by mass listed in Table 4, and a solvent in parts by mass listed in Table 4. A glass substrate was subjected to surface treatment using the obtained surface treatment liquid, and the water contact angle with respect to the surface-treated glass substrate was measured, in the same manner as in Example 1, except that a PET film was changed to a glass substrate. Measurement results of the water contact angles with respect to the glass substrate are listed in Table 4. Note here that the water contact angle with respect to an untreated glass substrate is 41.90.

TABLE 4

|  |  | Ex. 17 | Ex. 18 | Comp. Ex. 7 |
|---|---|---|---|---|
| Constituent units of (A) Resin (mol %) | A-1 | 95 | — | 100 |
|  | A-2 | — | — | — |
|  | A-3 | — | — | — |
|  | A-4 | — | — | — |
|  | A-5 | — | — | — |
|  | A-6 | — | — | — |
|  | A-7 | — | 95 | — |
|  | B-1 | — | — | — |
|  | B-2 | — | — | — |
|  | B-3 | — | — | — |
|  | B-4 | 5 | 5 | — |
|  | C-1 | — | — | — |
|  | C-2 | — | — | — |
|  | C-3 | — | — | — |
| Acid components having a pKa of 1 or less (parts by mass) | Ac1 | 1 | 1 | 1 |
|  | Ac2 | — | — | — |
| Acid components having a pKa of more than 1 (parts by mass) | Ac3 | — | — | — |
|  | Ac4 | — | — | — |
| (C) Solvents (parts by mass) | S1 | 3500 | — | 3500 |
|  | S2 | 1500 | — | 1500 |
|  | S3 | — | 5000 | — |
| Contact angle of water (°) |  | 11.1 | 95.8 | 41.5 |

Examples 17 and 18 show that, when a surface treatment liquid is used, which includes (A) resin consisting of unit B-4 including a cyano group as the functional group I and the hydrophilic unit A-1, (B) strong acid having a pKa of 1 or less, and a (C) solvent, the surface of the substrate made of glass as an inorganic material can be successfully made hydrophilic. On the other hand, Comparative Example 7 shows that, even when a glass substrate is subjected to surface treatment using a surface treatment liquid including (A) resin without including the functional group I, (B) strong acid having a pKa of 1 or less, and a (C) solvent, the water contact angle with respect to the glass substrate is not significantly different from that in the untreated state.

Example 19

Glass substrates were subjected to surface treatment using the surface treatment liquid of Example 1, and six surface-treated glass substrates were obtained, in the same manner as in Example 1, except that a PET film was changed to a glass substrate. The surface-treated glass substrates obtained were immersed in pure water, ethanol, propylene glycol monomethyl ether acetate (PGMEA), physiological saline, and 1N NaOH aqueous solution, at room temperature for six (6) months; and subsequently, each contact angle was measured. Further, the surface-treated glass substrate was immersed in 0.1 M $H_2SO_4$ aqueous solution at 100° C. for one-hundred (100) hours; and subsequently, the contact angle was measured. Under all of the aforementioned conditions, it was confirmed that the contact angle did not change before and after the immersion, and the resistance against chemical liquids was excellent.

What is claimed is:

1. A surface treatment liquid comprising a resin, a strong acid, and a solvent,
   wherein the resin includes a functional group I that is at least one group selected from the group consisting of a hydroxyl group, a cyano group, and a carboxyl group; and a functional group II that is a hydrophilic group or a hydrophobic group other than the functional group I, and when the functional group II includes a cyano group, the resin may not include the functional group I; the strong acid before being formulated has a pKa of 1 or less; the hydrophilic group of the functional group II is at least one selected from the group consisting of a polyoxyalkylene group, a sulfonic acid group, and a group represented by the following formula (A1):

—NH—R$^1$ (A1)

wherein R$^1$ represents an alkyl group having 1 to 4 carbon atoms substituted with at least one group selected from the group consisting of an amino group, a sulfonic acid group, and a hydroxyl group, or a hydrogen atom; and the hydrophobic group is at least one selected from the group consisting of a fluorinated hydrocarbon group, a silyl group, a siloxane group, an alkyl group having 6 to 20 carbon atoms, and an aromatic hydrocarbon group having 10 to 20 carbon atoms.

2. The surface treatment liquid according to claim 1, wherein the functional group II is a group represented by the following formula (A1):

—NH—R$^1$ (A1)

wherein R$^1$ represents an alkyl group having 1 to 4 carbon atoms substituted with at least one group selected from the group consisting of an amino group, a sulfonic acid group, and a hydroxyl group and a hydrogen atom.

3. The surface treatment liquid according to claim 1, wherein the functional group I is derived from a monomer represented by the following formula (A2):

$CH_2=CR^2—(R^3)_a—CO—R^4$ (A2)

wherein R$^2$ is a hydrogen atom or a methyl group, R$^3$ is a divalent hydrocarbon group, a is 0 or 1, R$^4$ is —OH, —O—R$^5$, or —NH—R$^5$, and R$^5$ is a hydrocarbon group substituted with at least one functional group selected from the group consisting of a hydroxyl group, a cyano group and a carboxyl group.

4. The surface treatment liquid according to claim 1, wherein the functional group II is the hydrophobic group and is at least one group selected from the group consisting of a fluorinated hydrocarbon group, a silyl group and a siloxane group.

5. The surface treatment liquid according to claim 1, wherein the functional group II is a hydrophobic group, and is derived from a monomer represented by the following formula (A3):

$CH_2=CR^2—(CO—O)_b—R^6$ (A3)

wherein R$^2$ is a hydrogen atom or a methyl group, b is 0 or 1, and R$^6$ is a fluorinated hydrocarbon group or is a group represented by the following formula (A4):

—SiR$^7$R$^8$—(—O—SiR$^7$R$^8$—)$_n$—R$^9$ (A4)

wherein R$^7$, R$^8$, and R$^9$ are each independently a hydrocarbon group having 1 to 6 carbon atoms, and n is an integer of 0 or more.

6. The surface treatment liquid according to claim 1, wherein the functional group II is a hydrophilic group, and is derived from a monomer represented by the following formula (A5):

$$CH_2=CR^2-CO-NH-R^1 \qquad (A5)$$

wherein $R^1$ is an alkyl group having 1 to 4 carbon atoms substituted with at least one group selected from the group consisting of an amino group, a sulfonic acid group, and a hydroxyl group, or a hydrogen atom, and $R^2$ is a hydrogen atom or a methyl group.

7. A surface treatment method comprising applying the surface treatment liquid according to claim 1 to a surface of a treatment target.

8. The surface treatment method according to claim 7, further comprising rinsing a section of the treatment target on which the surface treatment liquid has been applied.

9. The surface treatment method according to claim 7, wherein the treatment target is a substrate, and the surface treatment liquid is applied by spin coating.

10. The surface treatment method according to claim 7, wherein material for the surface of the treatment target to which the surface treatment liquid is to be applied is an organic material, and the resin has a hydroxyl group and/or a carboxyl group as the functional group I.

11. The surface treatment method according to claim 7, wherein material for the surface of the treatment target to which the surface treatment liquid is to be applied is an inorganic material, and the resin has a hydroxyl group and/or a cyano group as the functional group I.

12. The surface treatment liquid according to claim 1, essentially consisting of the resin, the strong acid, the solvent and an additional component selected from the group consisting of a coloring agent, a surface-active agent, a defoaming agent and a viscosity modifier.

* * * * *